United States Patent Office 2,933,894
Patented Apr. 26, 1960

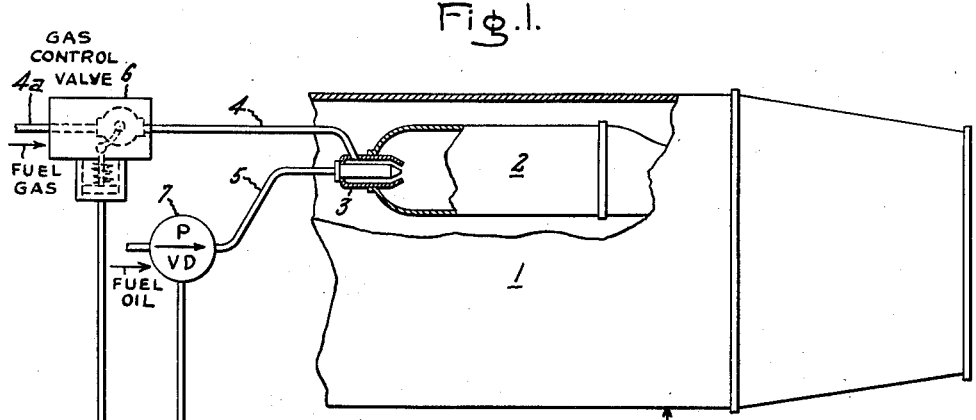
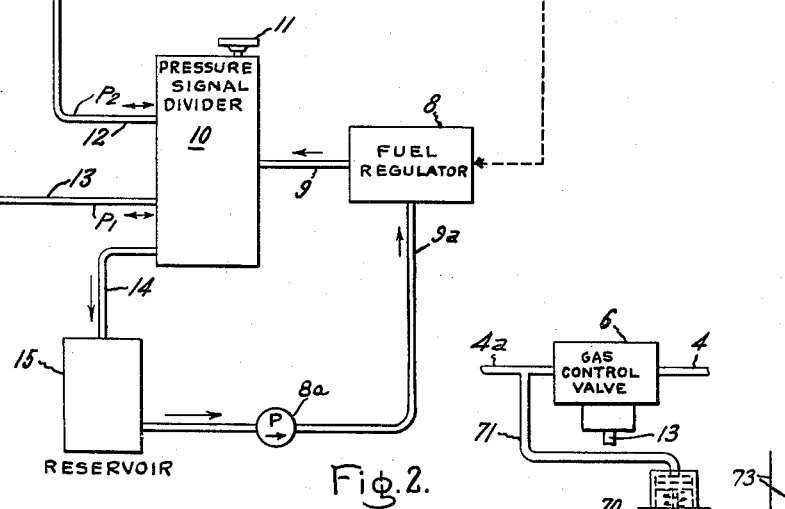
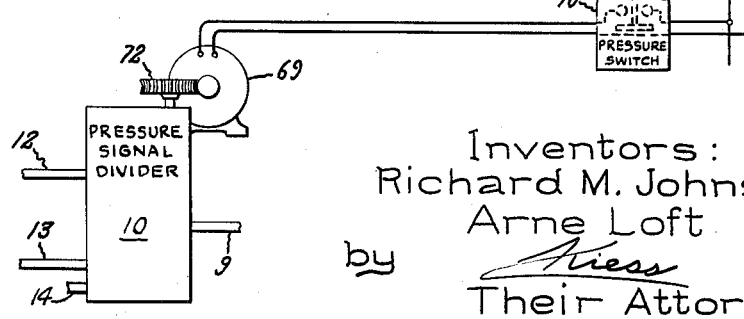

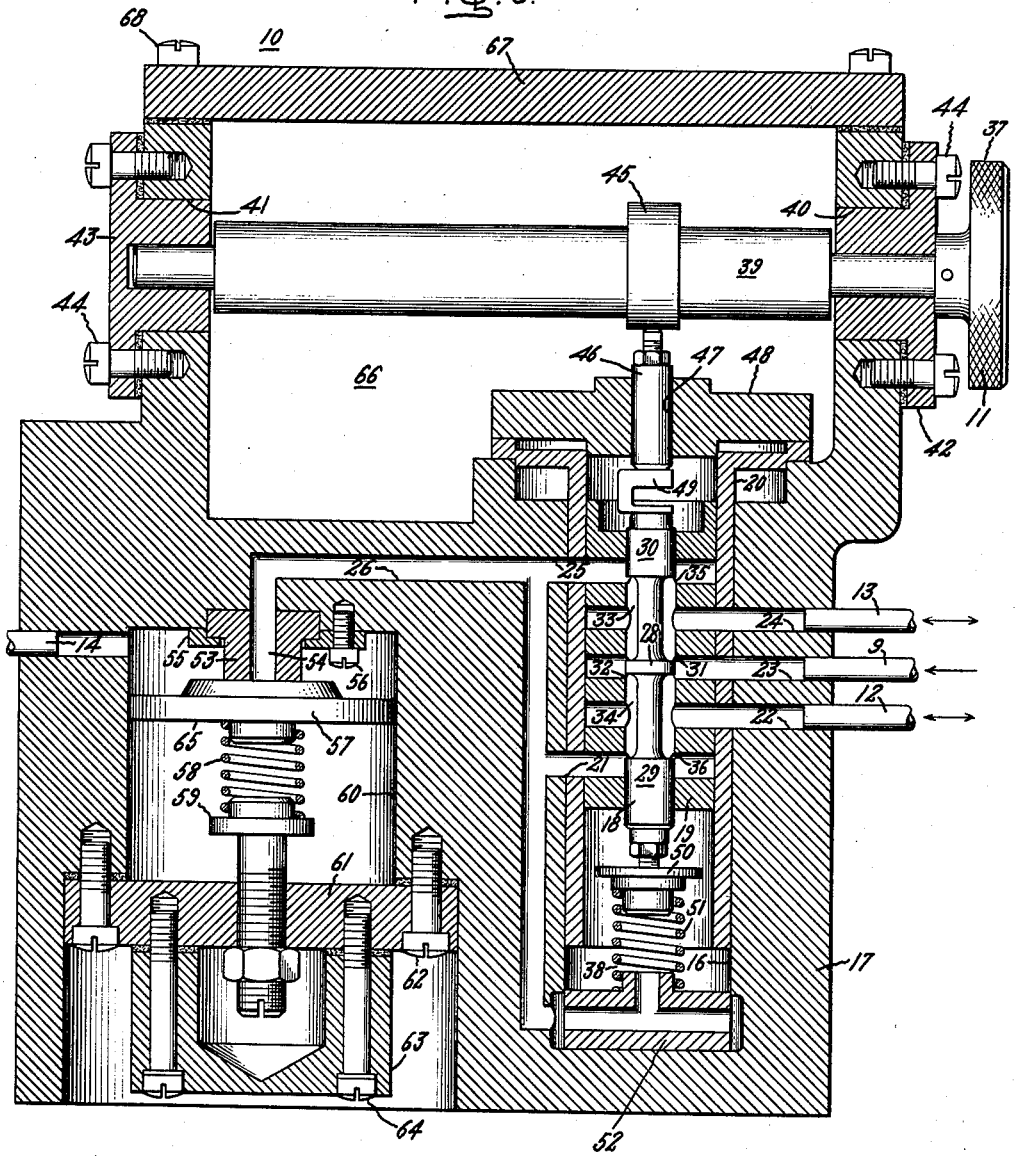

2,933,894

FUEL PROPORTIONING DUAL FUEL SYSTEM

Richard M. Johnson and Arne Loft, Schenectady, N.Y., assignors to General Electric Company, a corporation of New York Application October 25, 1954, Serial No. 464,318

1 Claim. (Cl. 60—39.28)

This invention relates to fuel systems for thermal power plants, particularly to a dual fuel supply system for a gas turbine power plant.

The gas turbine normally runs on one fuel during any given period. However, when the gas turbine is operated on gas received from a supplier there is to be considered the possibility that the available gas supply may not be sufficient for the turbine's needs. To meet this contingency, the gas turbine is set up to receive a liquid fuel to supplement a possibly inadequate gas supply. The gas and liquid fuel lines are fed into a dual fuel nozzle and then to the combustion chamber where they are mixed in the desired proportions.

In previous installations, whenever it was desired to change from gas to a liquid fuel, it was necessary to shut down the gas turbine and manually remove the fuel nozzles of the gas system and install fuel nozzles for the liquid fuel system, or have valves located in the various lines going to the combustion chambers and manually close and open these valves in the correct order at the correct rate. The shut down time and the difficulties encountered in combining the two fuels so that the required quantity is flowing into the combustors at all times by means of many valves are obviously undesirable.

Accordingly it is an object of this invention to automatically change fuels or to automatically regulate the supply of two fuels to a gas turbine or any other prime mover in whatever proportion desired without requiring shut down of the power plant or manual manipulation of many valves.

A further object is to provide a pressure divider which divides an input pressure into two output pressures the sum of which is equal to the input pressure.

Other objects and advantages will become apparent from the following description taken in connection with the accompanying drawings, in which Fig. 1 is a schematic view of the dual fuel system; Fig. 2 is a modified form of the dual fuel system and Fig. 3 is a sectional view of the pressure splitter.

Generally stated, the invention is practiced by separating a variable control oil pressure signal responsive to the operating conditions of the powerplant into two output oil pressure signals which regulate the flow of two fuels to the powerplant. The input signal pressure is divided so that the sum of the output pressure signals is equal to the input pressure plus a constant. Any desired ratio between the respective output pressure signals and thus the flow of the respective fuels to the powerplant may be obtained.

Referring now more particularly to Fig. 1, the dual fuel system is shown applied to a gas turbine 1 containing a combustor 2 to which fuel is supplied through a nozzle arrangement 3. The nozzle 3 is connected up to receive either a liquid fuel, gas, or both through conduits 4, 5. The flows of the fuels through the conduits 4, 5 are regulated by a gas control valve 6 and a fuel oil pump 7 respectively. The fuel oil pump 7 is illustrated as a variable delivery pump which alters its delivery in accordance with the control pressure in conduit 12. The gas control valve 6 is schematically disclosed as a piston operated pressure-responsive throttling valve which regulates gas flow in accordance with the control pressure signal in conduit 13. The sum total of the fuel flowing through the fuel pump and gas control valve is regulated by a special servo mechanism having speed, temperature and pressure responsive components. Such a gas turbine fuel regulator is disclosed, for instance, in U.S. Patent 2,558,592 issued June 26, 1951, on application to N. E. Starkey, Carl B. Lewis and M. A. Edwards and assigned to the same assignee as the present application. A regulator of this type is indicated diagrammatically at 8 in the drawing and is arranged to regulate the hydraulic pressure in conduit 9. The regulator is supplied oil pressure from a source such as a pump 8a through the conduit 9a. The regulator 8 produces an outlet pressure in conduit 9 which is determined by the desired operating condition of the turbine. This signal pressure in conduit 9 determines the amount of fuel required to operate the gas turbine at the condition indicated by the fuel regulator 8.

The pressure in conduit 9 will be referred to as the VCO (variable control oil) pressure. The VCO pressure is thus the pressure which determines the amount of fuel flowing into the gas turbine. The VCO pressure enters a pressure divider assembly 10 where it is split into two pressures $P_1$, $P_2$. The sum of pressures $P_1$, $P_2$ is equal to the VCO pressure plus a desired constant which is determined by a back pressure arrangement to be discussed later in detail. The two pressures $P_1$, $P_2$ are then transmitted to the gas control valve 6 and fuel pump 7 respectively where they control the flow of gas and liquid fuel to the turbine.

The gas control valve 6 and fuel pump 7 are so designed that in response to an equivalent VCO pressure, the turbine load characteristics obtained by the fuel flowing through the gas control valve 6 and the fuel pump 7 are substantially identical. Therefore, the total load available is substantially constant for a given VCO pressure regardless of the ratio of the pressures imposed on the gas control valve 6 and fuel pump 7. The pressure divider assembly 10, for example, may be set so that the entire signal pressure is transmitted to the gas control valve 6 in which case the gas turbine will be run entirely on gas. On the other hand, the VCO pressure may be divided up so that both gas and liquid fuel will be supplied to the nozzle 3. In the latter case, the sum of the fuels flowing to the combustor 3 will produce the required output load of the turbine.

The pressure divider assembly 10 may be adjusted by various means and is shown as being manually regulated by the handle 11 to change the ratio of the signal pressure flowing to the fuel pump 6 and gas control valve 7. This manual change can be made at any time during the operation of the turbine without requiring the turbine to be shut down.

In the modification shown in Fig. 2, the pressure divider assembly 10 is regulated by an electric motor 69 acting through a gear 72. Located in the line between the electric source 73 and the motor 69 is a pressure responsive switch 70. The switch 70 is responsive to the pressure in conduit 4a which is transmitted through conduit 71. The switch 70 is designed, as schematically illustrated, so that when the pressure in conduit 4a drops below a predetermined amount the switch 70 closes to complete the circuit and energize the motor to adjust the pressure divider assembly 10 to divert more of the signal pressure to the fuel pump 7 so as to provide more liquid fuel to compensate for the reduced amount of gas available.

With this arrangement the gas turbine can be set to operate on only gas within the range of its availability and to automatically cut in the second fuel only if the gas pressure should drop below that to be maintained in the conduit 4a.

This is done by first setting the pressure divider 10 so that the entire signal pressure will be sent to the gas control valve 6. If the requirements of the turbine are such as to require more gas than is available the reduced gas pressure will be reflected in conduit 71. The pressure switch is then closed to actuate the motor 69 to divert some of the signal pressure to the fuel pump 7 to increase the flow through the pump and reduce the amount taken from the gas line 4a. When the gas pressure is again normal, the circuit opens to shut off the motor 69.

The minimum pressure to be maintained in the line 4a is usually set by the gas supplier. This is done so that the turbine will not deprive other users of the gas by consuming too much of the available amount.

Referring to Fig. 3, there is illustrated in section, the VCO pressure divider 10. The pressure divider comprises a piston valve assembly for dividing up the VCO pressure, a manually operated arrangement for regulating the division of the VCO pressure, and a "constant adder" arrangement in the drain line of the piston valve so that the pressure for operating the fuel pump and gas control valve is a predetermined minimum.

The piston valve assembly is located in a bore 16 defined by the housing 17. The valve assembly comprises a piston valve 18 slidably disposed in a valve sleeve 19. The valve assembly is guided in the bore 16 by a tubular member 20.

The valve sleeve 19 and tubular member 20 define aligned axially disposed ports 21, 22, 23, 24, and 25. Ports 21 and 25 are drain ports and are in communication with passageway 26 defined by the housing 17 for returning the drained oil to the reservoir 15 through conduit 14 (see Fig. 1). The VCO pressure is supplied to the valve assembly 10 through conduit 9 and port 23. Pressure outlet ports 22, 24 are in communication with conduits 12 and 13 respectively for supplying the portion of the VCO pressure allotted to it to the fuel pump and gas control valve respectively.

The piston valve 18 has axially disposed lands 28, 29, and 30 which regulate the flow through inlet port 23 and drain ports 21 and 25 respectively. Upper and lower pressure chambers 33, 34 are formed between the land 28 and lands 30 and 29 respectively. The land 28 is slightly smaller than port 23 and when centrally located relative to port 23 equal orifice openings 31, 32 are defined leading from inlet port 23 to valve chambers 33 and 34 respectively. With the land 28 in the neutral position, the lands 29 and 30 are so located as to form orifice openings 35, 36 between the valve chambers 33, 34 and the drain ports 21, 25 respectively. These orifices 35, 36 are exactly equal to orifices 31, 32.

A back pressure is set up in the drain ports 21, 25 and drain line 26 by a relief valve 65 or other suitable constant adder means which can be set at any desired pressure.

By way of example only, consider a VCO pressure in port 23 of 200 p.s.i. and the back pressure in the drain ports 21, 25 and drain line 26 as being 40 p.s.i. When the oil under pressure flows into the pressure divider assembly 10 through conduit 9, the drain line 26 fills up developing a 40 p.s.i. back pressure. The difference between the VCO pressure and the back pressure in drain line 26 is the maximum drop that can occur across any flow path between the inlet and drain opening in the pressure divider assembly. This relief valve arrangement prevents the pressure in valve chambers 33, 34 and conduits 12, 13 from falling below 40 p.s.i. The minimum pressure in chambers 33, 34 provides for better operating characteristics of the fuel pump 7 and gas control valve 6, since they are spring loaded and are designed to operate accurately on a minimum pressure of 40 p.s.i. to avoid losses due to hysteresis.

From the above it can be seen that there are two flow paths formed between the inlet port 23 and the drain line 26. The upper flow path is formed by port 23, orifice 31, valve chamber 33, orifice 35, port 25 and drain line 26. The lower flow path is formed by port 23, orifice 32, valve chamber 34, orifice 36, port 21 and drain line 26. The total pressure drop in each of these flow paths will be 200 p.s.i. (the assumed VCO pressure) minus the 40 p.s.i. back pressure set up by the relief valve 65. There is no pressure drop through pressure outlet ports 22, 24 since they are part of a closed system leading only to the fuel pump 7 and gas control valve 6 for determining the amount of fuel flowing therethrough.

It can be appreciated by one skilled in the art of fluid mechanics that with the land 28 in the neutral position relative to port 23 the drop across the equal orifice openings 31, 35 are identical. Therefore, the total drop across orifices 31, 35 is equal to 200 p.s.i. (assumed VCO pressure) minus 40 p.s.i. (the back pressure set up by relief valve 65) or 160 p.s.i. The drop across each of the orifices 31, 35 is one-half the total drop or 80 p.s.i. Since the drop across orifice 31 is 80 p.s.i. the pressure in chamber 33 and the pressure in conduit 13 for controlling the gas control valve 6 is the VCO pressure (200 p.s.i.) minus the pressure drop across orifice 31 (80 p.s.i.) or 120 p.s.i.

Now in considering the lower flow path through orifice 32, valve chamber 34 etc., and the land 28 in the neutral position, the same flow principles can be applied. The total drop across the lower flow path and each of the orifice openings 32, 36 is equal to the drop across the upper flow path and each of orifices 31, 35 respectively. The pressure in chamber 34 and in conduit 13 for controlling the fuel pump 7 is therefore also 120 p.s.i.

The sum of the pressures in conduits 12, 13 is 240 p.s.i. or in other words is equal to the VCO pressure (200 p.s.i.) plus the back pressure (40 p.s.i.) fixed by the relief valve 65.

If it is desired to run the turbine on, for example, only gas, the piston valve is moved upward to close off orifice opening 31. When orifice 31 is closed off, orifice 36 is also blocked off due to the aforesaid relationship between the piston valve 18 and the ports in sleeve 19. Therefore, the pressure in conduit 12 is equal to the VCO pressure. At the same time it can be appreciated that since there is no pressure being supplied to valve chamber 33 and it is open to drain line 25, the pressure in conduit 13 will become 40 p.s.i. as determined by the relief valve 65. The total is still 240 p.s.i., or the VCO pressure plus the back pressure determined by relief valve 65. In this extreme position, it can be seen that the turbine will be operated on only one fuel. In the other extreme position, it will be operated on the other fuel.

Now let us consider the piston valve in a position between the neutral and extreme positions. In the neutral position, orifices 31, 32, 35, 36 are all equal. The lands 29, 30 are so located that upon movement of the piston valve 18 in a downward direction the orifice 36 is opened by the amount orifice 35 is closed. At the same time the orifice 31 becomes larger by the amount 32 shrinks. Thus, when the piston valve is moved downwardly the pressure drop across each of the flow paths remains the same but the drops across each of the orifices are changed. In the new position orifices 31 and 36 are equal and orifices 32 and 35 are equal.

When the piston valve 18 is moved in a downward direction, the orifices 31, 36 are enlarged by the amount orifices 32, 35 are reduced. The drop across the pairs of equal orifices are then correspondingly changed. That is, the drops across the smaller orifices are increased by the amount the drops across the larger orifices are decreased. The pressure drops across orifices 31 and 36 are equal and the pressure drops across 32 and 35 are equal.

The pressure in chamber 33 equals the VCO pressure minus the pressure drop across orifice 31 and the pressure in chamber 34 equals the VCO pressure minus the pressure drop across orifice 32. Therefore, assuming the pressure drop across orifice 31 to be 50 p.s.i. the pressure in chamber 33 is 200 p.s.i. (assumed VCO pressure) minus 50 p.s.i. or 150 p.s.i. The drop across the upper flow path is 200 p.s.i. (VCO pressure) minus 40 p.s.i. (relief valve back pressure) or 160 p.s.i. The drop across orifice 35 therefore equals the pressure in chamber 33 (150 p.s.i.) minus the back pressure (40 p.s.i.) or 110 p.s.i.

Since the pressure drops across orifices 32 and 35 are equal, the pressure in chamber 34 is 200 p.s.i. minus 110 p.s.i. (drop across orifice 35) or 90 p.s.i. The sum of the pressures in chambers 33, 34 again equals the sum of the VCO pressure (200 p.s.i.) plus the back pressure (40 p.s.i.) determined by relief valve 65.

Thus it can be seen that whatever position the piston valve is in, the sum of the pressures in conduits 12, 13 is equal to the VCO pressure plus a constant predetermined back pressure.

The piston valve 18 is adapted to be moved downward to various positions by a manually operated arrangement 37 and is urged upwardly by a spring means 38.

The arrangement for manually operating the piston valve 18 includes a shaft 39. The shaft 39 extends through the chamber 66 defined by the upper portion of the housing 17 and its ends are journaled in cap members 42, 43. The cap members are located in openings 40, 41 defined by the housing and they are secured to the housing by bolts 44. The chamber 66 is closed off by a cover 67 which is secured to the casing by bolts 68. The shaft is rotated by a handle 11 secured to one end thereof. Located on the shaft 39 is an eccentrically located cam member 45 which is adapted to be in contact with a rod 46. Rod 46 extends through hole 47 defined by the cover member 48 which closes the chamber containing the valve assembly from the upper housing chamber. At its lower end the rod contacts a bracket 49 secured to the piston valve 18. Thus it can be seen that upon rotation of the shaft 39 the cam 45 through the rod 46 and bracket 49 is capable of moving the piston valve 18 in a downward direction.

Fastened to the lower end of piston valve is a spring abutment member 50. A compression spring 51 is located between the spring abutment member 50 and the spring guide member 52 in the bottom of bore 16. The spring 51 urges the piston valve in an upward direction into contact with rod 46 and cam 45.

It can be appreciated that the location of the piston valve 18 is positively located by the operation of the handle 11 since the spring means 38 makes the bearing connection between the cam 45 and rod 46 the equivalent of a rigid connection.

The relief valve 65 located in drain line 26 serves to set up a back pressure in the drain line. This back pressure limits the drop between the inlet port 23 and the drain line 26. The setting of the relief valve 65 determines the minimum pressure in the valve chambers 33, 34.

The relief valve 65 is disposed in the bore 60 in housing 17 and comprises a seat member 53 having an inlet opening 54. The seat member 53 is retained in the housing 17 by a plate member 55 and bolts 56. A valve disk 57 is biased to close inlet 54 by a spring 58. The spring 58 abuts at its other end against an abutment member 59 which may be adjusted to give whatever spring force desired. The member 59 is disposed in cover plate 61 which is secured to housing 17 by bolts 62. The end of the abutment member 59 is secured against tampering by a cap member 63 which is secured to the housing by bolts 64.

Thus, it will be seen that the invention provides for a dual fuel system which can be automatically regulated to provide a desired quantity of each of the fuels without requiring shutdown of the turbine. The amount of fuel required by the turbine is determined by a signal pressure which is then divided into the desired proportion by a pressure divider and then transmitted to the regulating means for controlling the flow of the separate fuels.

While only two embodiments of the invention have been described, it will be apparent to those skilled in the art that many alterations and substitutions of mechanical equivalents may be made. For instance, the relief valve 65 may be removed making the pressure in the drain line 26 atmospheric. With this arrangement the drop across each of the upper and lower flow paths will be equal to the total VCO pressure. When that is the case, the sum of the pressure in chambers 33, 34 will be equal to the VCO pressure. The pressure divider 10 will thus serve to divide the inlet pressure in port 23 into two outlet pressures the sum of which is equal to the inlet pressure.

Also, the piston valve 18 may be operated by a solenoid or other control means in place of the manual arrangement disclosed.

Other modifications within the scope of the invention might include a different type of relief valve in the drain line 26 or some other type of device for setting up a back pressure in drain line 26. Also, in place of the pressure sensitive switch 70 a switch responsive to the flow in the gas control line could be used.

This arrangement is not limited to a dual fuel system operated on gas and oil but would work the same for two fluids, gases, liquids, powders or otherwise, the flows of which are to be regulated.

While the pressure splitter is illustrated as dividing the inlet pressure into two outlet pressures which are equal to the inlet pressure plus a constant, it is well within the knowledge of one skilled in the art that this device could be modified to obtain whatever outlet pressures desired by changing the sizes of the lands and the orifices. For example, the sum of the outlet pressures could be made equal to one and one-half times the VCO pressure or whatever other multiple of the VCO pressure desired.

Other equivalents will occur to those skilled in the art, and it is of course, intended to cover by the appended claim all such modifications as fall within the true spirit and scope of the invention.

What we claim as new and desire to secure by Letters Patent of the United States is:

In a dual fuel system for a thermal power plant, first and second sources of fluid fuels under pressure, first and second conduit means for supplying fuel from said sources to the power plant, first and second control means each constructed and arranged to control the flow of fuel through said respective conduits in response to an imposed fluid pressure signal, regulating means establishing a first signal pressure adapted to vary in accordance with operating conditions of the power plant, said operating conditions being those which are indicative of the fuel requirements of the thermal powerplant pressure dividing means connected to receive said first signal pressure and constructed and arranged to supply a separate control pressure to each of said first and second control means, said pressure dividing means comprising a housing defining a bore and axially spaced inlet, pressure outlet, and drain ports communicating with the bore, the inlet port being located between two pressure outlet ports and the drain ports being disposed at the sides of the respective pressure outlet ports remote from the inlet, a stem slidably disposed in the bore and having axially spaced lands in cooperative relation with the inlet and drain ports, first and second pressure chambers defined by the lands between the inlet port and said respective drain ports, said lands forming orifice openings between each of the pressure chambers and the inlet and respective drain ports when the stem is in a neutral position, said outlet ports being in communication with said respective chambers, actuating means for positioning said stem whereby the orifice openings may be altered to vary said control pressure signals whereby the control means are caused to control the supply of the two fuels to the power plant in a ratio determined by the position of the stem and its associated lands relative to the inlet and drain ports and pressure regulating valve means associated with said drain ports for maintaining the back-pressure on said drain ports above a preselected minimum value whereby the sum of the static pressures in said first and second outlet chambers is substantially equal to the sum of the variable signal pressure and the preselected back-pressure.

References Cited in the file of this patent
UNITED STATES PATENTS

| | | |
|---|---|---|
| 1,833,265 | Schmidt | Nov. 24, 1931 |
| 1,954,442 | Dall et al. | Apr. 10, 1934 |
| 2,395,671 | Kleinhans et al. | Feb. 26, 1946 |
| 2,454,222 | Shepherd | Nov. 16, 1948 |
| 2,569,766 | Klein et al. | Oct. 2, 1951 |
| 2,637,334 | Starkey | May 5, 1953 |
| 2,649,107 | Avery | Aug. 18, 1953 |
| 2,690,167 | Moulton | Sept. 28, 1954 |
| 2,722,199 | Blanchette et al. | Nov. 1, 1955 |